United States Patent Office 3,022,245
Patented Feb. 20, 1962

3,022,245
REFINING PROCESS FOR PETROLEUM WAX
Byron G. Spars, Madison, Wis., and Patrick P. McCall, New Monmouth, N.J., assignors to Esso Research and Engineering Company, a corporation of Delaware
No Drawing. Filed Nov. 2, 1959, Ser. No. 850,065
3 Claims. (Cl. 208—26)

The present invention is concerned with the production of high quality petroleum waxes. This invention is more particularly concerned with a hydrofining treatment of petroleum waxes in order to improve color and odor and reduce content of carbonizable substances thereof.

The problem of refining and stabilizing petroleum waxes is a difficult one of long standing. The use of petroleum waxes and particularly paraffin wax in the preservation of foods and in the coating of food containers requires waxes which are free from odor and possess excellent color and stability. Numerous processes have been suggested to improve the quality of paraffin waxes including clay treating, acid and caustic washing, hydrogenation and hydrofining and combinations of hydrofining and treatment with an adsorbent such as bauxite, alumina, silica gel or activated charcoal.

In general, these processes have proved to be unsatisfactory for one reason or another. Some of the processes are objectionable because of low yields, or low quality of product or non-uniformity of product. Hydrofining processes which have the potential of offering substantial commercial advantages in comparison with acid-caustic treatment or adsorption, have not proven entirely satisfactory either because the mild, selective conditions employed to avoid undesirable side reactions do not give sufficient improvement in the properties of the treated waxes or catalyst life, particularly of the more active catalysts, has been too short to be commercially attractive.

It is an object of the present invention to provide a process for treating petroleum waxes with hydrogen in the presence of a solid catalyst to form products possessing excellent color, odor and stability characteristics.

It is also an object of this invention to provide a process for treating petroleum waxes with hydrogen in the presence of solid catalysts to form products possessing uniformly excellent color, odor and stability characteristics for extended periods of time.

These and other objects will appear more clearly from the detailed specification which follows.

It has now been found that greatly improved results can be obtained in the catalytic hydrofining of petroleum waxes by the use of an inverse temperature gradient in the reactor or by using a system comprising two or more reactors in series with a substantially lower temperature maintained in each succeeding reactor. In this way, the wax is first hydrofined at a high temperature to obtain an initial rapid improvement in quality and then at lower temperatures to take advantage of the more favorable chemical equilibrium. Catalyst requirements for wax hydrofining can be reduced as much as one-half by the inverse temperature gradient technique of the present invention. Of even greater importance is the fact that highest quality products of excellent stability are produced.

The petroleum waxes treated in accordance with the present invention are the waxy components which boil in the range of from about 670° F. to 900° F. at atmospheric pressure. The waxes are composed principally of normal paraffins of about the $C_{20}$ to $C_{32}$ range. The waxes are deoiled to less than 1% and preferably to less than 0.5% oil content and have melting points of from 115° F. to 155° F. The crude wax feed to the process has a color (Tag Robinson) as low as 4 to 20 and a U.S.P. acid as high as 80 (measured by dilution with white oil). In order to meet quality specifications the refined wax should be essentially colorless, odorless and tasteless, should have a +25 to +30 Saybolt color and U.S.P. acid of 5 or less. In addition the refined wax should be odorless and must have good odor stability, a wax which retains good color in an accelerated test (16 hours at 230° F.) being considered satisfactory.

The hydrofining of the wax can be effected in any suitable reactor. In view of the fact that the catalysts used herein retain their activity for prolonged periods of time, fixed bed reactors are entirely suitable. Flow may be downflow or upflow in the reactor although ordinarily downflow operation is preferred since it minimizes thermal exposure time and when running a series of waxes in blocked operation, downflow minimizes the volume of slop cuts between various grades. If a temperature gradient is utilized in a single reactor vessel, suitable means such as cooling coils or other suitable heat transfer means are required to maintain the reaction mixture at the desired temperature levels in the low temperature zone. If the reactor system comprises two or more vessels in series, suitable cooling means can be arranged between the vessels or the succeeding vessels may be provided with suitable heat transfer means to maintain the desired temperature in each vessel. It is preferred that the hydrogen treat gas be combined with the wax feed before heating the reaction mixture up to initial reaction temperature.

The catalysts used for hydrofining waxes in accordance with this invention is cobalt molybdate or mixtures of cobalt oxide and molybdenum oxide dispersed upon an alumina support or carrier. In general, such catalysts are prepared by first forming adsorptive alumina particles in any suitable way and then compositing molybdenum oxide and cobalt oxide therewith. The molybdenum oxide can be added as a slurry or as a solution of ammonium molybdate. The cobalt oxide is conveniently added as a salt such as cobalt nitrate or acetate, salts which are readily decomposed to cobalt oxide and volatile material. The cobalt oxide and molybdenum oxide may be provided in equimolar amounts or a molecular excess of one over the other may be used. Suitable catalysts contain from about 5 to about 25 wt. percent of cobalt oxide and molybdenum oxide with the ratio of the former to the latter in the range of from about one to five to about five to one. In order to improve the activity of the hydrofining catalysts it is preferred to sulfide the same prior to use as by treatment with a suitable sulfiding agent such as hydrogen sulfide, carbon disulfide, ethyl mercaptan or the like, preferably in the presence of hydrogen. The amount of sulfur added is preferably at least 25% of the stoichiometric quantity necessary to convert the catalytic metal oxides to the corresponding sulfides.

The hydrofining of the wax feed is effected at pressures above about 400 p.s.i.g., preferably at about 600 p.s.i.g. Higher pressures of up to about 1000 p.s.i.g. can also be used but ordinarily the higher cost of equipment to withstand such pressures and the higher cost of operation at higher pressures makes it uneconomic to use pressures above about 800 p.s.i.g.

The temperature in the first stage or pass in the wax hydrofining operation is between about 500° and 650° F., preferably at about 600° F. The temperature in the second stage or zone should be at least 100° F. lower than in the first stage and generally is between about 400° F. and 500° F., preferably about 450° F. The feed rate in the first stage is about 3 to 5 v./v./hr. preferably about 4.4 v./v./hr. at 600° F. and about 1 to 2 v./v./hr. preferably about 1.75 v./v./hr. at 450° F. in the second stage.

Hydrogen or hydrogen-rich treat gas is supplied with the feed wax at rates of from 200 to 750 s.c.f. per barrel of liquid feed. The treat gas preferably should contain at least 90 vol. percent of hydrogen.

The following examples are illustrative of the present invention.

*Example I*

A wide-cut San Joaquin crystalline wax having a color of −16 Saybolt and a U.S.P. acid of 20 was hydrofined in a temperature gradient operation in accordance with the present invention. The catalyst used was 10–14 mesh particle size cobalt molybdate catalyst. The operating pressure was 600 p.s.i.g., with a treat gas rate of 500 s.c.f./b. of 100% hydrogen. Two reactors were used, connected in series flow. Inlet temperature to the first reactor was 570° F. and outlet temperature was 520° F. The gas/wax mixture then passed through a short transfer line to the second reactor, which was operated at 450° F. inlet temperature and 400° F. outlet temperature. Catalyst loading was equivalent to 3.0 v./v./hr. in the higher temperature reactor and 1.5 v./v./hr. in the lower temperature zone. Overall feed rate was 1.0 v./v./hr. The catalyst was activated prior to this operation by treating it with a gas containing 3% $H_2S$ and 97% hydrogen at 600° F. and 600 p.s.i.g. for 10 hours. Sufficient sulfur to convert 50% of the cobalt and molybdenum to the corresponding sulfides was passed over the catalyst. The results from this temperature gradient operation are shown below and compared to results from constant temperature runs:

|  | Constant Temperature | | Temperature Gradient |
|---|---|---|---|
|  | 600° F. | 400° F. |  |
| Product Color, Saybolt | <+27 | +30 | +30 |
| Product USP Acid | 5 | 3 | 2 |
| V./v./hr. | 0.5 | 0.5 | 1.0 |

To achieve the same degree of conversion at constant temperature required half the v./v./hr., that is to say twice the volume of catalyst at the same wax feed rate, as did the temperature gradient run. In the constant temperature runs, all other conditions (pressure, treat gas rate and composition, catalyst) were the same as cited above for the temperature gradient run.

*Example II*

A Panhandle crystalline wax having a color of 5 T.R. and a U.S.P. acid of approximately 80 (back-calculated from U.S.P. acid of a diluted sample) was hydrofined using a two-pass technique with the first pass at high temperature and the second pass at a lower temperature, in accordance with the present invention. As in Example I, pressure was 600 p.s.i.g., with 500 s.c.f./b. of 100% hydrogen used as treat gas, and the catalyst was activated by treating it with 3% $H_2S$/97% hydrogen.

The Panhandle wax was first hydrofined at 600° F. and 1 v./v./hr. The product from this operation was then repassed over the catalyst in blocked operation at 1 v./v./hr. and at temperatures of 275° F., 400° F., 500° F., and 600° F. The results of these runs are shown below, and compared to results from constant temperature operation at the same overall v./v./hr.

|  | Constant Temperature | | Two-Pass Operation [1] | | | |
|---|---|---|---|---|---|---|
|  | 400° F. | 600° F. | 275 | 400 | 500 | 600 |
| Product Color, Saybolt | −9 | +22 | +30 | +30 | +30 | +26 |
| Product USP Acid | 16 | 8 | 3 | 3 | 5 | 8 |
| Overall, v./v./hr. | 0.5 | 0.5 | 0.5 | 0.5 | 0.5 | 0.5 |

[1] First pass at 600° F. and 1 v./v./hr.; second pass at 1 v./v./hr. and indicated temperature.

These results show that best results are obtained when the second pass is run at low temperatures, and that it is not possible to obtain as good results by constant temperature operation at the same overall v./v./hr.

*Example III*

A San Joaquin heavy crystalline wax having a 12¼ T.R. color and an estimated U.S.P. acid of 32 was hydrofined in a two-pass process in accordance with the present invention. The catalyst and the presulfiding treatment were the same as in Example I. The feed was first hydrofined in one reactor at 600° F. and 600 p.s.i.g. at a feed rate of 5 v./v./hr. in admixture with 200 s.c.f./b. of 100% hydrogen treat gas.

The product from the first reactor was then used as feed for the second reactor in which the temperature and feed rate were varied. The pressure in the second reactor was 600 p.s.i.g.; the treat gas rate was 200 s.c.f. of 100% hydrogen per barrel of rewax feed. The results of this two-temperature, two-pass operation are tabulated below.

|  | Color, Say. | U.S.P. Acid | Overall, v./v./hr. |
|---|---|---|---|
| First Pass Product (600° F., 5 v./v./hr.) | +18 | 7 | 5.0 |
| Second Pass Product: |  |  |  |
| 500° F., 3 v./v./hr. | +27 | 4 | 1.9 |
| 450° F., 5 v./v./hr. | +20 | 4 | 2.5 |
| 450° F., 2 v./v./hr. | +28 to +30 | 4 | 1.4 |
| 400° F., 1 v./v./hr. | +28 | 4 | 0.83 |

These data show the necessity for a second reactor at a lower temperature where a more favorable equilibrium exists for the +30 Saybolt color specification. At 450° F. and 2 v./v./hr. in the second reactor, colors of +20 to +30 were obtained with an overall flow rate of 1.4 v./v./hr., whereas +27 Saybolt was the best color obtainable at 1.4 v./v./hr. feed rate in any constant temperature run with this wax feed.

*Example IV*

A prolonged demonstration run and life test was made to ascertain long-term performance of the wax hydrofiner operated in accordance with the present invention. The two reactors were connected in series and charged with 10–14 mesh particle size cobalt molybdate catalyst, pretreated with gas composed of 3% $H_2S$ and 97% hydrogen, at 600° F. and 600 p.s.i.g. for 10 hours. In the sulfiding operation, the amount of sulfur passed over the catalyst was sufficient to convert 50% of the cobalt and molybdenum to the corresponding sulfides.

The volume of catalyst in the first reactor was 50 cc. and the bed height was 7 inches while the volume of catalyst in the second reactor was 125 cc. and the bed height was 17½ inches. The operating conditions used were 600° F. and 4.4 v./v./hr. in the first reactor and 450° F. and 1.75 v./v./hr. in the second for an overall flow rate of 1.25 v./v./hr. Both reactors were at 600 p.s.i.g. and the hydrogen-to-wax ratio was 500 s.c.f./bbl.

A San Joaquin heavy wax of 12¼ T.R. color and estimated 32 U.S.P. acid was charged to the system for about 110 hours whereupon a Panhandle semi-refined wax of 9¾ T.R. color and estimated 70 U.S.P. acid was charged for about 30 hours and finally a San Joaquin light crystalline wax of +11 Saybolt color and 7 U.S.P. acid was charged for the next 110 hours. Each of these waxes yielded +30 Saybolt color products and U.S.P. acids below 5, rising from 1.0 initially to 2 to 3 on San Joaquin heavy and Panhandle S.R., and running about 1.0 for the San Joaquin light.

At this point San Joaquin light was removed from the demonstration run and more severe catalyst treatment was obtained by alternating between the San Joaquin heavy and Panhandle feeds described above. The process continued to convert these waxes to products meeting color and acid specifications under the above conditions. Use of a mixed gas (70% $H_2$/30% $CH_4$) at 200 s.c.f./bbl. caused the product color to degrade to +26 Saybolt.

*Example V*

After 1728 hours of onstream operation, feed was cut out and the catalyst was regenerated. The catalyst was removed from each reactor after first dropping the temperature, then the pressure (50 p.s.i.g./hr.), and finally nitrogen purged. The catalyst from the two reactors was combined and placed in a 200 cc. regeneration reactor and regenerated with about 5% air in steam at a maximum flame front temperature of 750° F. After regeneration the catalyst was removed from the regenerator and weighed yielding a total of 84 grams out of 119 grams originally charged. Catalyst loss was attributed to the transfer operation as well as catalyst attrition resulting from heating, cooling, pressuring, depressuring during regeneration. The regenerated catalyst was distributed between the two reactors in the same proportions as originally charged. Bed volumes were made up to the original level by adding inert packing at the bottom of each bed. The regenerated catalyst was treated with 3% $H_2S$ and 97% hydrogen at 600° F. and 600 p.s.i.g. for about 10 hours whereupon the treatment of the above Panhandle S. R. wax feed was resumed. The flow rates of both wax and gas were reduced to maintain the previous overall wax space velocity of 125 v./v./hr. and 200 s.c.f./bbl. gas to wax ratio. The treat gas was a 90% $H_2$/10%$N_2$ gas mixture and the pressure was 670 p.s.i.g. The first reactor was maintained at 600° F. and the second at 450° F. as before. The Panhandle product was +35 Saybolt color for over 100 hours and the U.S.P. acid for the product varied between 2 and 3.

*Example VI*

The run as described in Example V was continued and 1% CO was added to the treat gas. The color of the product fell off slowly from +35 to +32 after 52 hours while the U.S.P. acid also increased slightly from 2–3 to 3–4 over the same period. Resuming with the 90% $H_2$/10% $N_2$ gas mixture without the CO restored catalyst activity as shown by the +35 Saybolt color and the 2–3 U.S.P. acid inspections of the product.

What is claimed is:

1. The method of upgrading crystalline petroleum waxes which comprises treating the wax in admixture with a hydrogen-rich gas in a first treating stage in contact with a hydrofining catalyst at temperatures between 500 and 650° F. and at pressures of between 400 and 1000 p.s.i.g., at feed rates of 3 to 5 v./v./hr. and treating the reaction mixture from this treatment step in contact with a hydrofining catalyst at temperatures between 400 and 500° F. and at least 100° F. lower than the treatment in the first treating stage and at essentially the same pressure as in the first treating step.

2. The method as defined in claim 1 in which the petroleum waxes have an oil content of less than 1% and a melting point of from about 115–155° F.

3. The method as defined in claim 2 in which the hydrofining is effected at about 600 p.s.i.g. and at a temperature of about 600° F. in the first stage and at a temperature of about 450° F. in the second stage.

References Cited in the file of this patent

UNITED STATES PATENTS

| | | |
|---|---|---|
| 2,116,061 | Dorrer | May 3, 1938 |
| 2,658,856 | Perry et al. | Nov. 10, 1953 |
| 2,914,470 | Johnson et al. | Nov. 24, 1959 |
| 2,915,452 | Fear | Dec. 1, 1959 |
| 2,917,448 | Beuther et al. | Dec. 15, 1959 |